US005596946A

United States Patent [19]
Bryant et al.

[11] Patent Number: 5,596,946
[45] Date of Patent: Jan. 28, 1997

[54] POULTRY AND BIRD FEED DELIVERY SYSTEM

[76] Inventors: John C. Bryant, 9210 Henry Harris Rd., Fort Mill, S.C. 29715; James C. Harkey, 8501 Landsford Rd., Monroe, N.C. 28112

[21] Appl. No.: 435,802

[22] Filed: May 4, 1995

[51] Int. Cl.$^6$ .................................................. A01K 39/01
[52] U.S. Cl. ............................................... 119/52.1
[58] Field of Search ................... 119/52.1, 52.4, 119/53, 53.5

[56] References Cited

U.S. PATENT DOCUMENTS

| | | |
|---|---|---|
| 848,492 | 3/1907 | Rees . |
| 903,309 | 11/1908 | Ottinger . |
| 1,365,367 | 1/1921 | Bettenga . |
| 1,404,251 | 1/1922 | Westenberger . |
| 1,623,840 | 4/1927 | Kassy . |
| 2,222,369 | 11/1940 | McLeod ................................. 119/52 |
| 2,464,644 | 3/1949 | Kwash ................................... 119/52 |
| 2,667,858 | 2/1954 | Cussotti ................................. 119/52 |
| 2,735,401 | 10/1956 | Diseker ................................ 119/52.1 |
| 3,249,090 | 5/1965 | Ripley .................................. 119/52 |
| 4,995,343 | 2/1991 | Cole ...................................... 119/53 |
| 5,275,131 | 1/1994 | Brake et al. ........................ 119/52.4 X |

*Primary Examiner*—Robert P. Swiatek
*Assistant Examiner*—Yvonne Abbott
*Attorney, Agent, or Firm*—Ralph H. Dougherty; Scott E. Hanf

[57] ABSTRACT

A hopper-trough feeding device for young turkeys or other fowl consisting of an inverted conical shaped feed storage hopper and circular feed trough dish combination with geometric proportions which virtually eliminates food contamination and optimize feeding rates. The feeder is useful in commercial brooder houses as a free standing, manually filled feeder until turkey poults reach an age where they can be removed from brood pens, at which time the feeder can be attached to existing automatic screw conveyor feed delivery systems as a replacement feeding device.

20 Claims, 11 Drawing Sheets

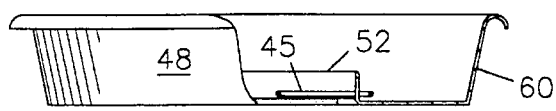
FIG. 24
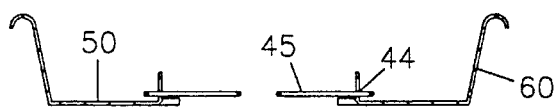
FIG. 25
FIG. 26
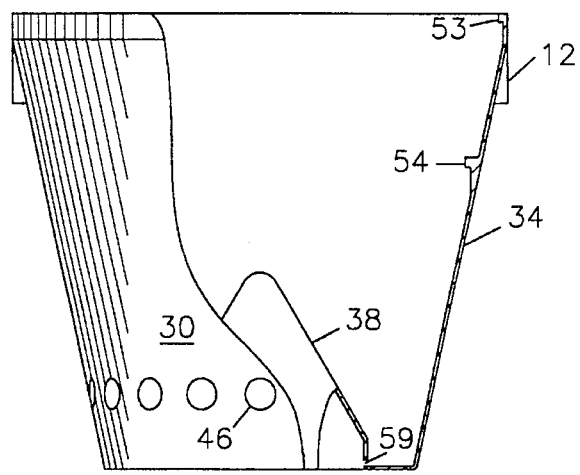
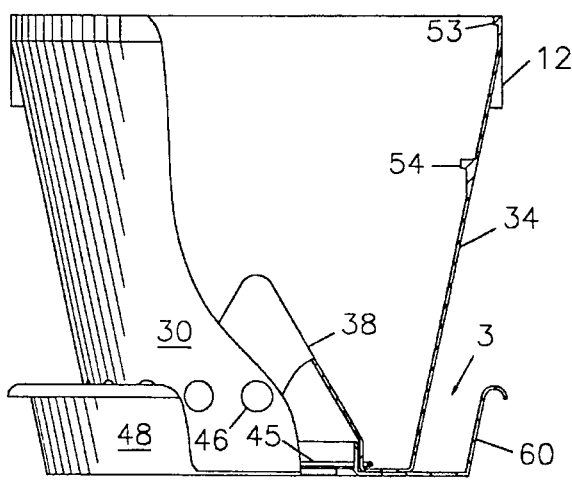
FIG. 27

| SAMPLE DATE | DAY | AVERAGE WEIGHT (GRAMS) | | % DIFF | WEIGHT DIFF |
|---|---|---|---|---|---|
| | | OLD FEEDER | NEW FEEDER | | |
| 11/23/94 | 2 | 62.3 | 64.4 | 3.5 | 2.2 |
| 11/26/94 | 5 | 90.3 | 102.9 | 14.0 | 12.6 |
| 11/30/94 | 9 | 128.5 | 155.6 | 21.1 | 27.1 |
| 12/01/94 | 10 | 153.2 | 176.0 | 14.9 | 22.8 |
| 12/03/94 | 12 | 205.4 | 227.0 | 10.5 | 21.6 |
| 12/04/94 | 13 | 213.0 | 239.8 | 12.6 | 26.8 |
| 12/07/94 | 16 | 248.6 | 277.3 | 11.6 | 28.8 |
| 12/11/94 | 20 | 339.2 | 388.1 | 14.4 | 48.9 |
| 12/20/94 | 29 | 729.1 | 871.1 | 19.5 | 142.0 |
| 12/28/94 | 37 | 1172.6 | 1282.0 | 9.3 | 109.4 |
| 04/17/95 | 147 | 13598.9 | 14806.6 | 8.9 | 1207.6 |

POULTRY AND BIRD FEED DELIVERY SYSTEM

CROSS REFERENCE TO DISCLOSURE DOCUMENT

This application is based on the Disclosure Document filed by John C. Bryant with the U.S. Patent Office on Sep. 23, 1994, entitled SANITARY POULTRY FEEDER.

FIELD OF THE INVENTION

The present invention relates to feeding systems for raising poultry and other domestic birds and animals on a commercial scale. In particular, this invention is directed to feeder apparatus of these systems which present and deliver feed, especially to turkeys and other poultry.

BACKGROUND OF THE INVENTION

In today's commercial brooder houses, young turkey poults are maintained in brood pens for several days and are fed from shallow open top feed pans. The feed becomes contaminated with bedding material and fecal matter when the turkeys walk into and around in the feed pans. The open top feed pans must also be refilled once or twice a day in a continuous operation in large brooder houses. After the turkey poults reach an age of approximately one week they are removed from the brood pens and allowed to roam freely through the brooder house where they feed from automatic feed delivery systems. The automatic feed systems consist of a screw conveyor which delivers feed to a multitude of open circular feed pans. The birds are small enough for several weeks to climb into the feed pans where they contaminate the feed and block access to the feed for most other poults.

DESCRIPTION OF RELATED ART

Applicants are aware of the following U.S. Patents concerning apparatus and methods of feed control for poultry or birds.

| U.S. Pat. No. | Issue Date | Inventor | Title |
| --- | --- | --- | --- |
| 848,492 | 03-26-1907 | Rees | POULTRY FEEDER AND WATERER |
| 903,309 | 11-10-1908 | Ottinger | FEED TROUGH |
| 1,365,367 | 01-11-1921 | Bettenga | ANIMAL FEEDING DEVICE |
| 1,404,251 | 01-24-1922 | Westenberger | POULTRY FEEDER |
| 1,623,840 | 04-05-1927 | Kassy | CHICKEN FEEDER |
| 2,222,369 | 11-19-1940 | McLeod | CHICKEN FEEDER |
| 2,464,644 | 03-15-1949 | Kwash | MODERN CHICK FEED CONTAINER |
| 2,667,858 | 02-02-1954 | Cussotti | POULTRY FEEDER |
| 3,249,090 | 05-03-1966 | Ripley | ANIMAL FEEDER |
| 4,995,343 | 02-26-1991 | Cole | FEEDER APPARATUS |

Rees U.S. Pat. No. 848,492 provides a simple, inexpensive, efficient, and ornamental device adapted for feeding and watering poultry, which would prevent waste of food and water. This device refurbishes the food and water automatically as it is consumed.

Ottinger U.S. Pat. No. 903,309 provides a feeding device for stock, poultry and the like, which has a conical bottom to allow automatic refurbishment of the feed trough.

Bettenga U.S. Pat. No. 1,365,367 provides an open top feeding device intended for feeding animals such as hogs. This device allows for drainage of liquids through the feed to keep the feed moist without getting soggy.

Westenberger U.S. Pat. No. 1,404,251 provides a feeding device which replenishes the food for the animals without scratching or throwing the food out of the device. This device also protects the young chicks while they are feeding during rain, and snow.

Kassy U.S. Pat. No. 1,623,840 provides a chicken feeder, wherein all waste in the feeding of chickens is eliminated and the feed tray is automatically maintained as long as the supply of feed is not entirely dissipated.

McLeod U.S. Pat. No. 2,222,369 provides a device to feed baby chicks from age one day to six weeks old, which prevents waste of feed.

Kwash U.S. Pat. No. 2,464,644 provides a poultry feeder which automatically refurbishes the feed tray and protects the feed from the weather. This device also protects the feed from being scattered and thereby contaminated by poultry droppings.

Cussotti U.S. Pat. No. 2,667,858 provides a poultry feeder which is economical and light-weight and is assembles easily to facilitate cleaning.

Ripley U.S. Pat. No. 3,249,090 provides a portable animal feeder to feed hay and other foods to cattle, in the shape of a hollow rectangular box. This device protects the feed from the elements to prevent spoilage.

Cole U.S. Pat. No. 4,995,343 provides a versatile feeder to automatically feed domestic birds and animals.

SUMMARY OF THE INVENTION

This invention relates to improvements in turkey feeders of the hopper-trough classification and feeding apparatus used in commercial brooder houses as part of automatic feed delivery systems.

In today's commercial brooder houses, young turkey poults are maintained in brood pens for several days and are fed from shallow open top feed pans. The feed becomes contaminated with bedding material and fecal matter when the turkeys walk into and around in the feed pans. The open top feed pans must also be refilled once or twice a day in a continuous operation in large brooder houses. After the turkey poults reach an age of approximately one week they are removed from the brood pens and allowed to roam freely through the brooder house where they feed from automatic feed delivery systems. The automatic feed systems consist of a screw conveyor which delivers feed to a multitude of open circular feed pans. The birds are small enough for several weeks to climb into the feed pans where they contaminate the feed and block access to the feed for most other poults.

The invention consists of a conical shaped feed hopper which dispenses feed on demand into a circumferential trough. The geometric shape and size of the feeder components prevent turkey poults from entering the feed to spread contamination without restricting access to the feed for consumption.

OBJECTS OF THE INVENTION

The primary objective of this invention is to provide a feeding device to be used in turkey brooder houses which will promote better turkey health and more rapid weight gain by increasing access to feed while eliminating feed contamination with fecal matter and bedding material.

Another objective of this invention is to provide a hopper-trough feeder with a specific geometric design which will maximize poult access to the feed for feeding and render it impossible for poults to stand or walk around in the feed trough.

Another objective of this invention is to provide a free standing hopper-trough feeder to replace the conventional open pan feeders now used in commercial brooder houses for feeding turkeys during the first few days of life, which will hold sufficient feed to support turkeys until they are ready to transition to an automatic conveyor feeding system without the need for refilling.

Still another objective of this invention is to provide an improved apparatus to replace the open feed pans used on most commercial automatic conveyor feed systems.

Still another objective of this invention is to provide a feeder which can be easily disassembled for cleaning and provide compact storage when not in use.

BRIEF DESCRIPTION OF THE DRAWINGS

The foregoing and other objects will become more readily apparent by referring to the following detailed description and the appended drawings in which:

FIG. 24 is an elevation of the feed trough dish with a portion of the side wall broken away.

FIG. 25 is a section view through the feed trough dish.

FIG. 26 is an elevation of the feed hopper with a portion of the side wall broken away.

FIG. 27 is an elevation of the assembled feeder with the hopper and trough dish partially broken away to show the interior and exterior features of the feeder.

DETAILED DESCRIPTION

Figure 1:
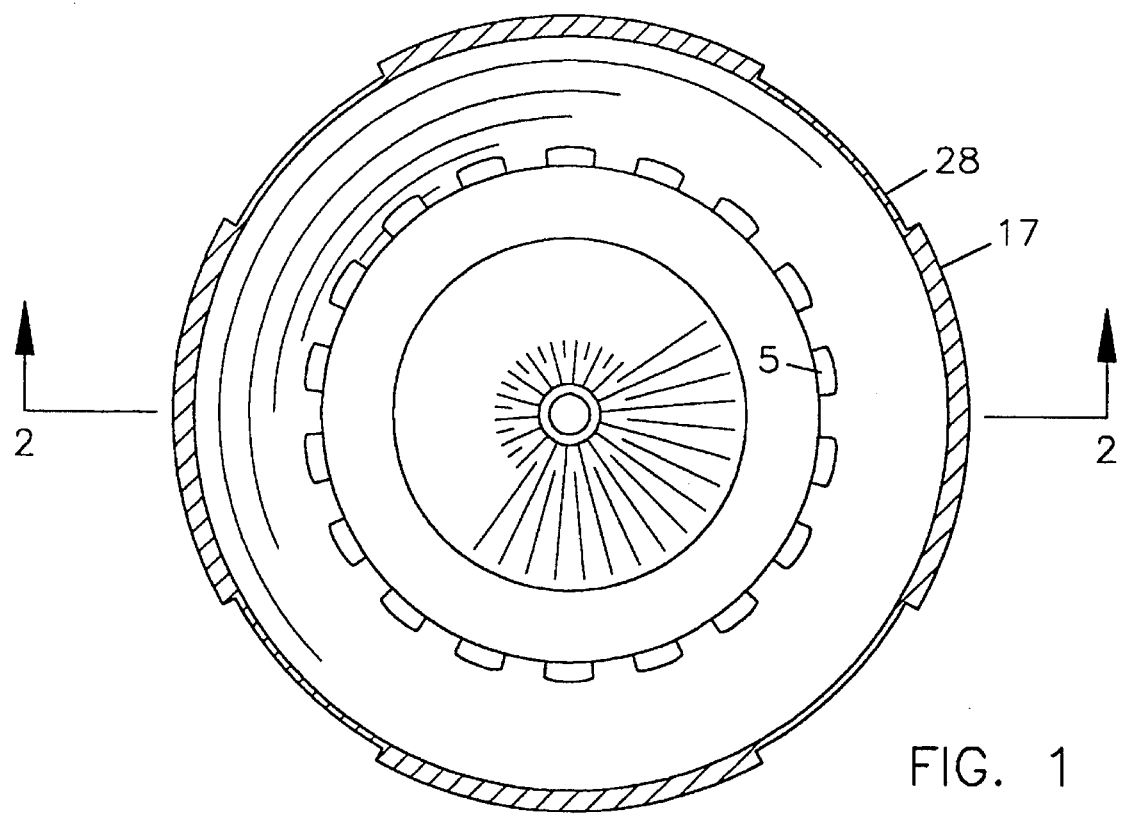
FIG. 1 is a plan view of the feed hopper.

Referring now to the drawings, the feeder is composed of two components: feed storage hopper 1 and feed trough dish 2.

Figure 2:
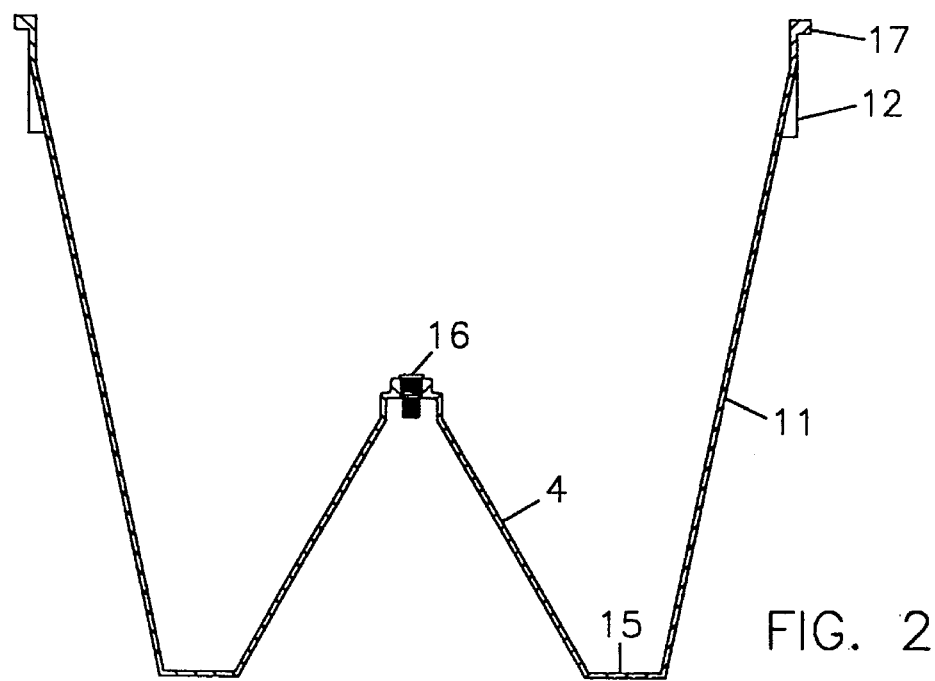
FIG. 2 is a section view through the feed hopper.
Figure 3:
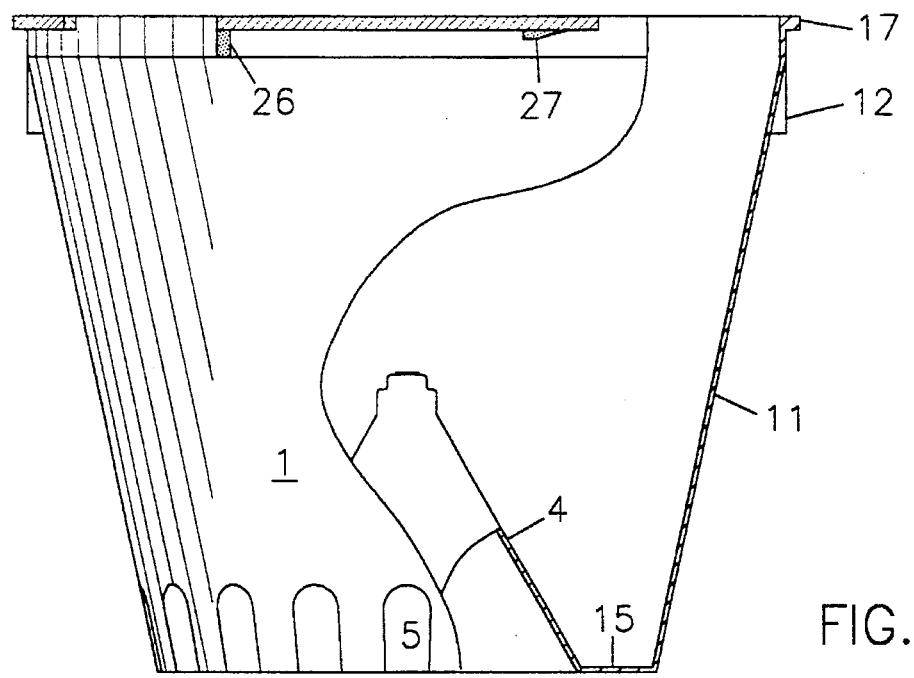
FIG. 3 is an elevation of the feed hopper with a portion of the side wall broken away.
Figure 11:
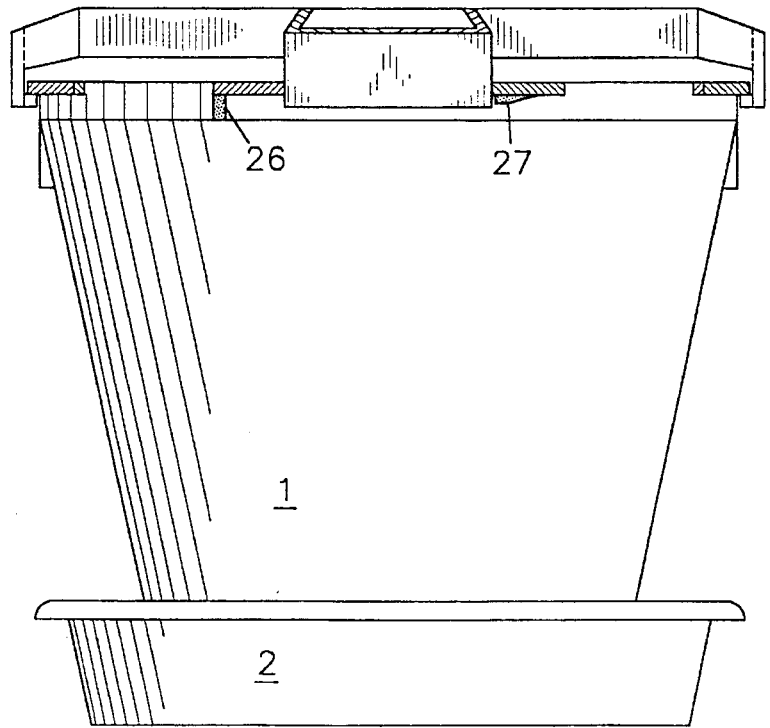
FIG. 11 is an elevation of the assembled feeder attached to the adapter ring.
Figure 12:
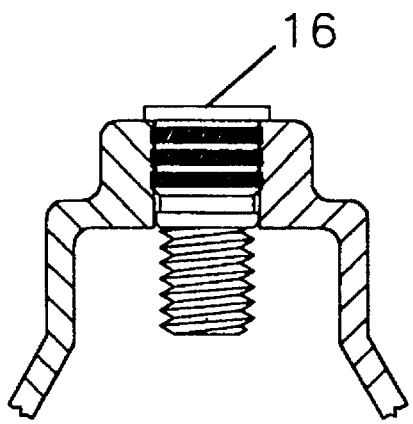
FIG. 12 is an enlarged view of the feed hopper threaded connection stud insert.
Figure 13:
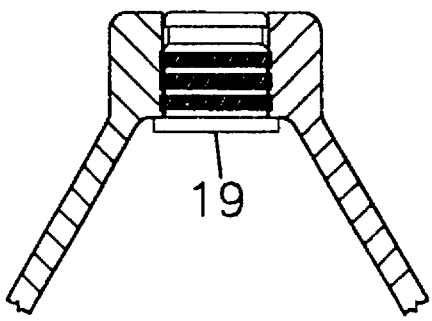
FIG. 13 is an enlarged view of the trough dish threaded connection sleeve insert.
Figure 14:
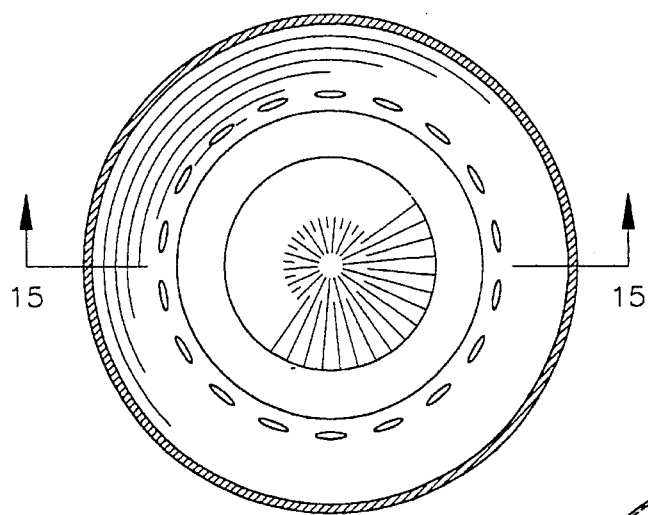
FIG. 14 is a plan view of a first alternative embodiment of the invented feed hopper.
Figure 16:
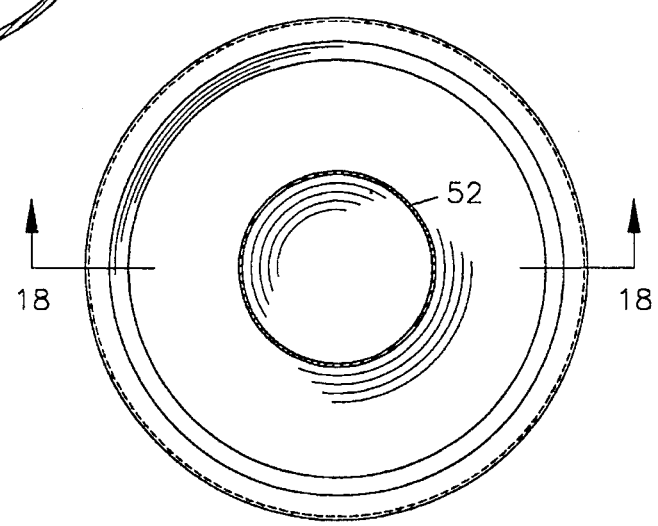
FIG. 16 is a plan view of the feed trough dish.
Figure 15:
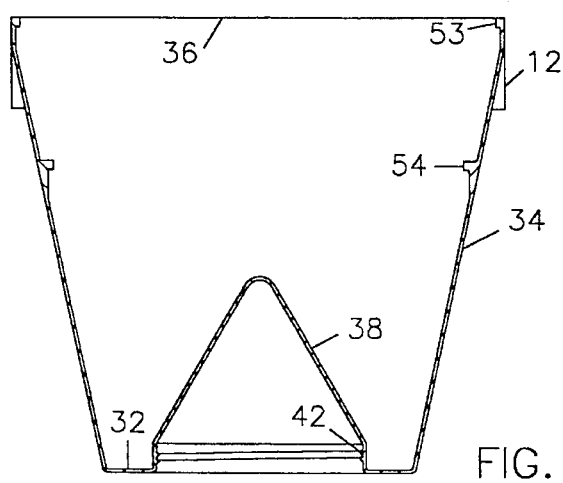
FIG. 15 is a section view through the feed hopper.
Figure 17:
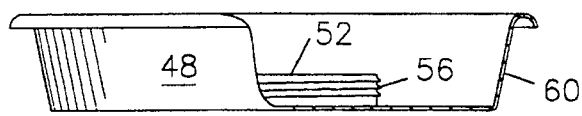
FIG. 17 is an elevation of the feed trough dish with a portion of the side wall broken away.
Figure 18:
FIG. 18 is a section view through the feed trough dish.
Figure 19:
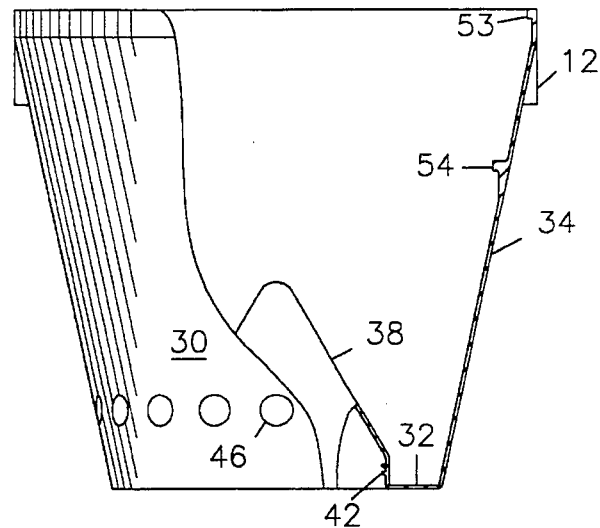
FIG. 19 is an elevation of the feed hopper with a portion of the side wall broken away.
Figure 20:
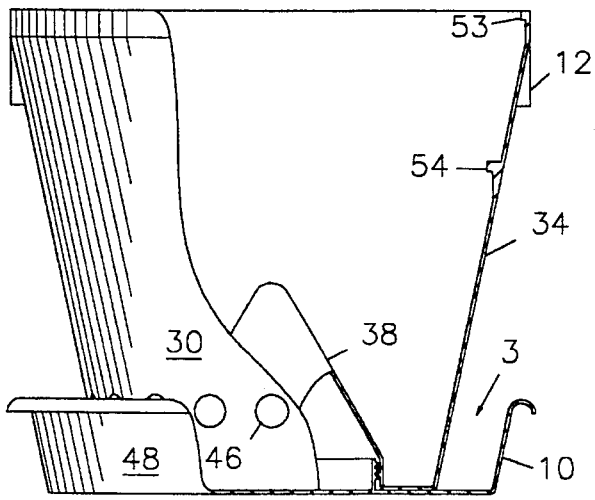
FIG. 20 is an elevation of the assembled feeder with the hopper and trough dish partially broken away to show the interior and exterior features of the feeder.
Figure 21:
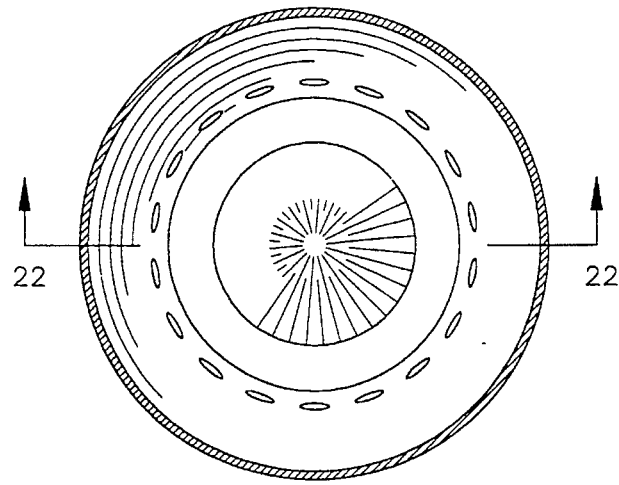
FIG. 21 is a plan view of a second alternative embodiment of the invented feed hopper.
Figure 22:
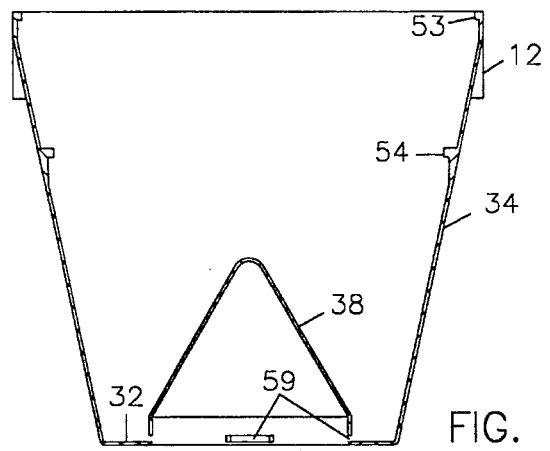
FIG. 22 is a section view through the feed hopper.
Figure 23:
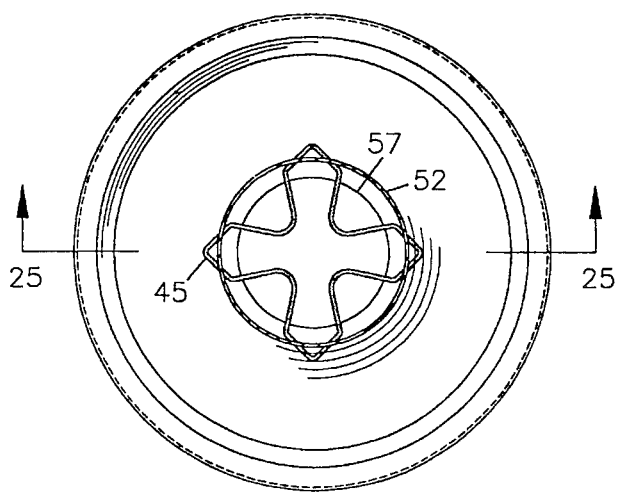
FIG. 23 is a plan view of the feed trough dish.

As shown in FIGS. 1 through 3, the feed storage hopper 1 consists of an inverted truncated cone or frustum shaped open top vessel. The floor 15 of said vessel is flat immediately adjacent to the peripheral wall 11 and has an integral concentric conical projection 4 rising out of the floor to facilitate feed distribution through oblong holes 5 symmetrically located in the peripheral wall 11. At the apex of the conical projection 4 is a threaded stud insert 16 projecting downward to allow connection to the trough dish 2. Four equally spaced outwardly projecting tabs 17 located at the top of the hopper wall 11 and slots 28 between said tabs provide means for quick connection to automatic feed conveyor systems using an adapter ring as shown in FIG. 11. The adapter ring will be connected to and remain in place on the distribution header of any commercial automatic feed conveying system. Bolster fins 12 ace located near the top of the hopper peripheral wall to prevent formation of a vacuum seal between feed hoppers when stacked together.

Figure 4:
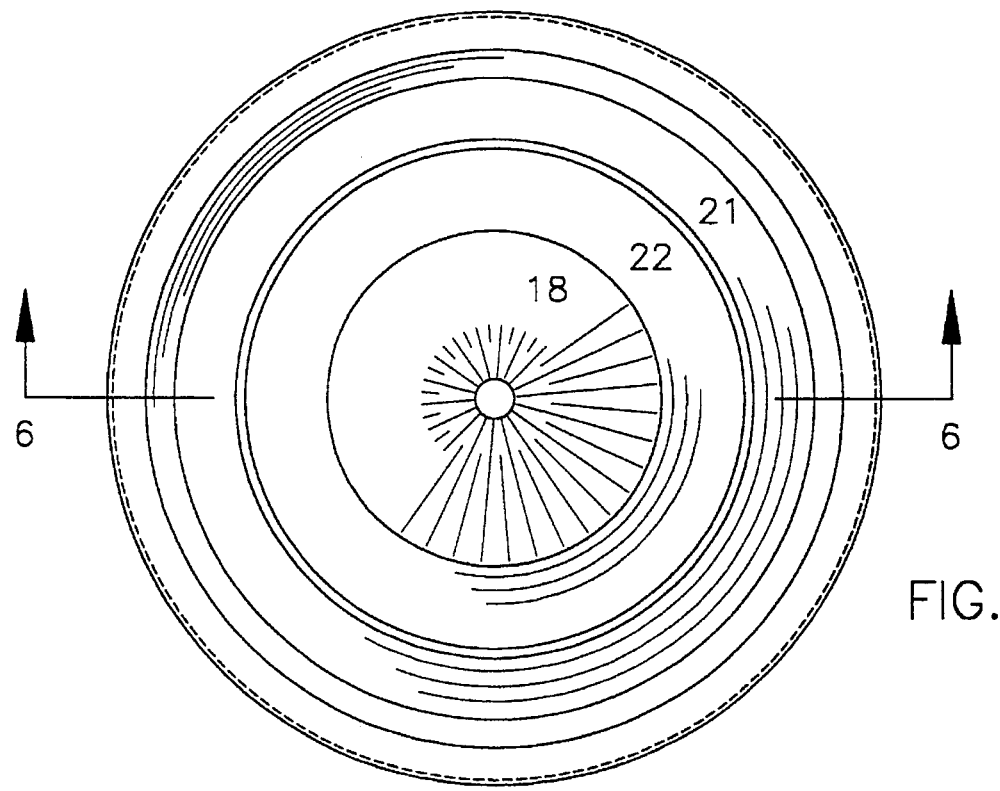
FIG. 4 is a plan view of the feed trough dish.
Figure 5:
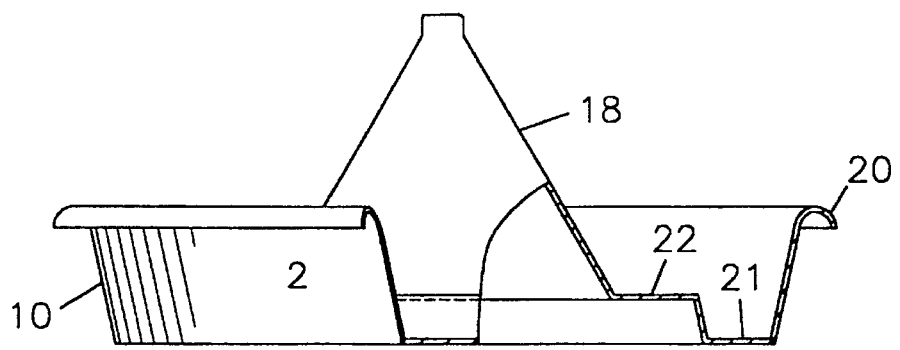
FIG. 5 is an elevation of the feed trough dish with a portion of the side wall broken away.
Figure 6:
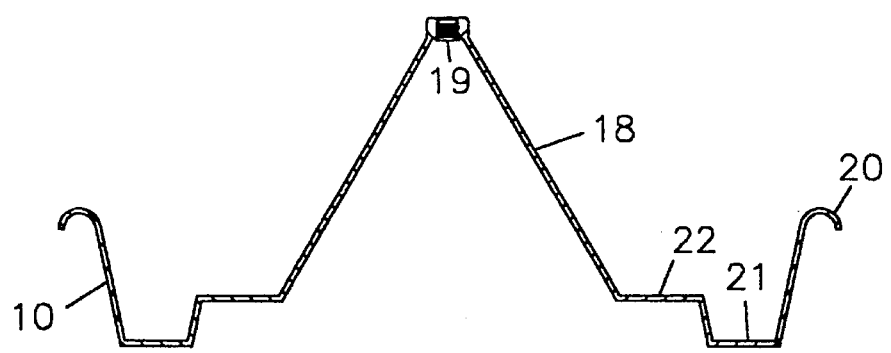
FIG. 6 is a section view through the feed trough dish.

Referring to FIGS. 4 through 6, the feed trough dish 2 consists of a circular pan with outwardly sloping peripheral wall 10 of the same pitch as hopper peripheral wall 11. The trough dish has a flat circular floor 21 immediately adjacent to the peripheral wall 10 stepping up to an elevated flat concentric circular floor 22 with a concentric conical projection 18 to provide precise centering of the trough dish on the bottom of the feed hopper 1. At the apex of the conical projection 18 is a threaded sleeve insert 19 to allow attachment to hopper 1 by means of the threaded stud 16. The top of the trough dish peripheral wall 10 terminates with a semicircular rim 20 for stiffness.

Figure 7:
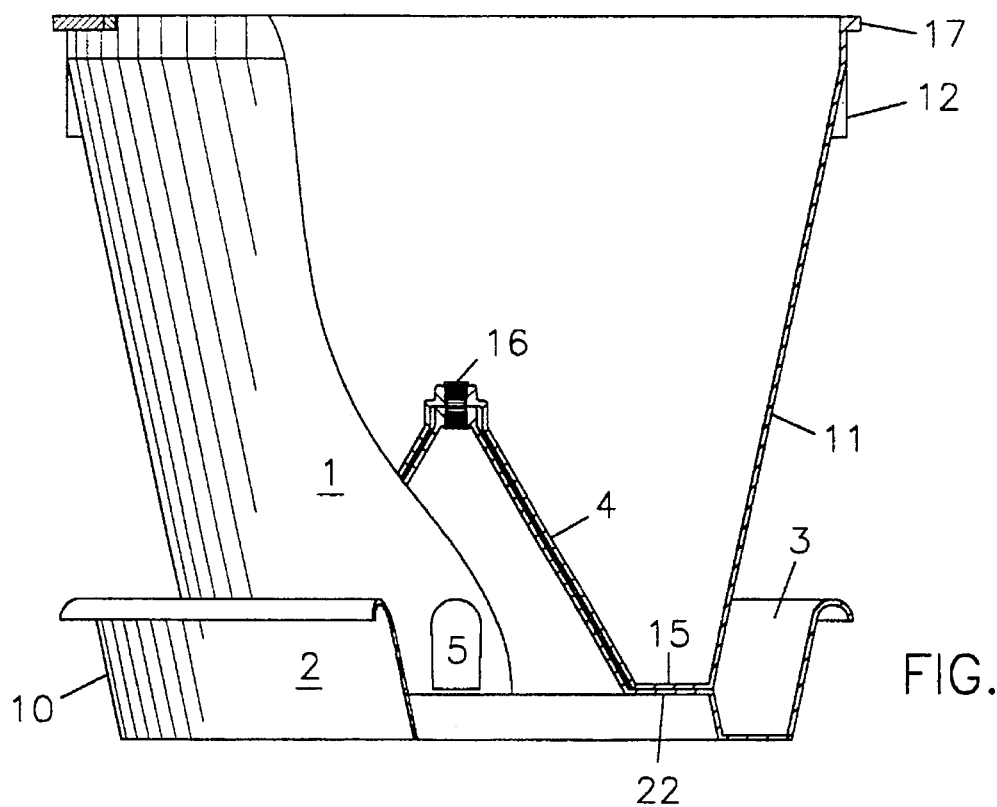
FIG. 7 is an elevation of the assembled feeder with the hopper and trough dish partially broken away to show the interior and exterior features of the feeder.

Referring to FIG. 7, the hopper 1 and trough dish 2 together form the complete feeding device. When connected the bottom surface of the hopper floor 15 rests on the trough dish raised floor 22. The hopper has a smaller base diameter than the trough dish which forms a continuous circular feeding trough 3. Feed stored in the hopper 1 is dispensed through the holes 5 in the hopper peripheral wall 11 into the feed trough 3 by gravity. The holes 5 are set to an elevation which will prevent feed from spilling over the side of the trough dish. As feed is consumed by the turkey poults additional feed is dispensed automatically to the trough 3. Feed contamination is prevented in two ways. Turkey poults can not step into the feeding trough 3 because the slope of the hopper peripheral wall 11 is set to an angle which will not allow the center of gravity of a turkey poult to pass over the outer edge of the trough dish. Some prior art feeders accomplished this with barriers and intermittent openings which also limited access to the food. The hopper is tall enough to prevent turkey poults from jumping inside and contaminating the feed.

Figure 8:
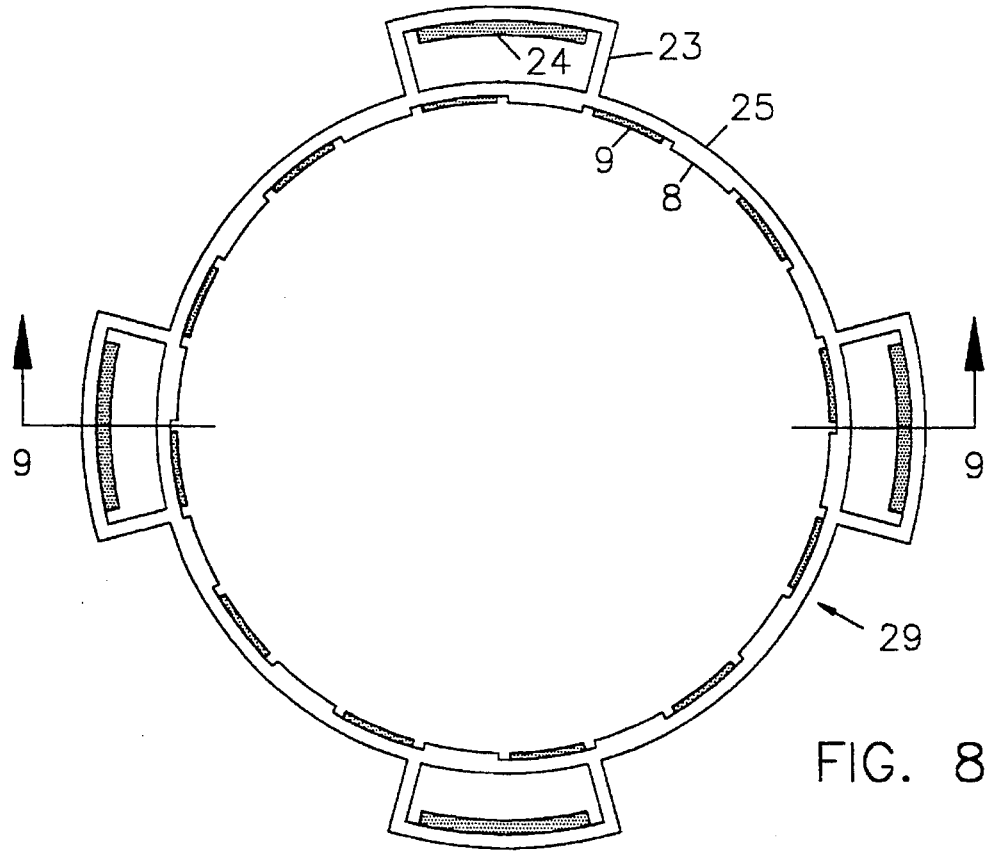
FIG. 8 is a plan view of the adapter ring.
Figure 9:
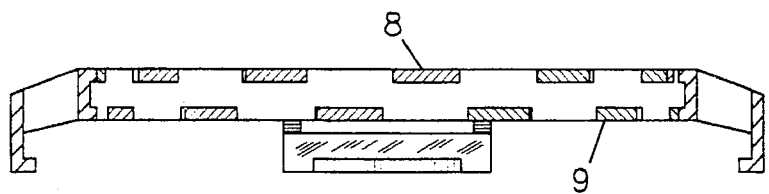
FIG. 9 is a section view through the adapter ring.
Figure 10:
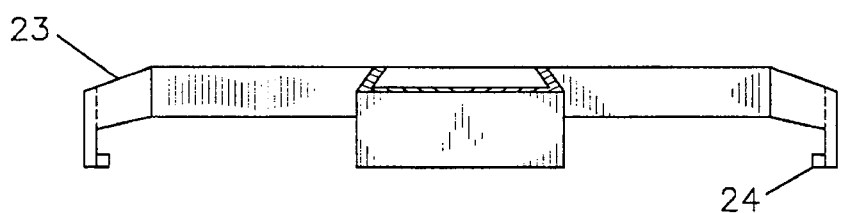
FIG. 10 is an elevation of the adapter ring.

Referring to FIGS. 8 through 10, the adaptor ring 29, FIG. 8, consists of a circular ring 25 with alternating top and bottom tabs 8 and 9 on the inside of the ring to form a grappling slot for connection to the distribution header (not shown) of any commercial automatic feed conveying system. Four sets of cantilever arms 23 with tabs 24 project from the ring 25 on the four quadrants. The feeder is connected to the adapter ring by insertion of the four tabs 24 through the slots 28 at the top of the feed hopper and rotating approximately 45 degrees. Stops 26 and 27 located on the underside of hopper tabs 17 will prevent the feeder from "walking off" the adapter ring during operation of the feed conveyor.

Initially the feeder is used in brood pens to feed newborn turkey poults. To save the farm labor previously used for refilling open top feed pans, the hopper is sized to hold sufficient feed to last four to five days. When the poults are ready to be removed from the brood pens, the feeders can be attached to an existing automatic feed distribution system to supply the poults with a high volume of sanitary feed for the balance of their stay in the brooder house.

ALTERNATIVE EMBODIMENTS

While the invented feeding apparatus shown in FIGS. 1 to 13 is preferable, this same system will work with a bird feeder having a feed storage hopper 30, FIGS. 15, 19, 22 and 26. Hopper 30 has an inverted frustum geometry and is comprised of a bottom 32, a peripheral wall 34 and an open top 36. The hopper bottom 32 is flat adjacent to the peripheral wall 34 with a concentric conical projection 38 rising out of the bottom 32. Peripheral wall 34 has uniformly spaced feed distribution apertures 46 spaced from the bottom. These apertures can be virtually any geometric configuration, including but not limited to circles, ovals, squares, rectangles, triangles, octagons, hexagons or pentagons. Tabs 53 and 54 project inward from the inside of the hopper wall to provide a grappling point for connection to conveyor feed distribution systems. A feed trough dish 48 is provided with a flat floor 50 and a concentric cylindrical hub 52 rising out of the floor. Concentric cylindrical hub 52 can have threads 56 to facilitate a fixed attachment to feed storage hopper 30. The trough dish also has an outwardly sloping peripheral wall 60.

The feed storage hopper may be connected to the trough dish by either a threaded connection as illustrated in FIGS. 15 to 20 or a bayonet type connection as illustrated in FIGS. 22 to 27. The threaded connection is made by threads 42 in the bottom portion of the hopper conic projection 38 and threads 56 in the concentric cylindrical hub 52 of the trough dish. The bayonet type connection is achieved by means of a four point star shaped retainer spring 45. The points of the retainer spring project through slots 44 in the cylindrical hub 52 of the trough dish and slots 59 in the hopper conic projection 38. Quick disconnection may be achieved by application of pressure towards the center of the retainer spring 45 through a concentric hole 57 in the floor of the trough dish.

When the connecting means are engaged the feed storage hopper is securely fastened to the feed through. The feed storage hopper and the trough can be molded or configured as a single piece or it can be made of multiple pieces. The outwardly sloping peripheral wall of the trough preferably has a semicircular rim stiffener.

The feed storage hopper peripheral wall is outwardly sloping at a specific angle which will preclude a new born poult (such as a turkey or chicken) from passing its center of gravity, or body over the outer rim of the feed trough. The peripheral wall prevents poults from entering the feed trough to contaminate feed or block access to other poults for feeding.

While this unit is ideal for use with young turkeys, it can also be used with other poultry or by reducing the overall dimension it can be used with most any type of bird or foul.

EXAMPLES

Testing has been conducted comparing weight gain for young turkeys using the present invention and using a conventional feed trough. Turkeys fed with the present invention show weight gain increases of better than ten percent.

TABLE 1

| | | | | | |
|---|---|---|---|---|---|
| | | BIRD WEIGHT READINGS IN GRAMS ARE FOR 10 BIRD LOTS BIRD WEIGHT READINGS ARE FOR 5 BIRD LOTS ON DAY 20 | | | |
| | DAY | CONVENTIONAL FEEDER | NEW FEEDER | DAY | CONVENTIONAL FEEDER | NEW FEEDER |
| | 2 | 767 | 628 | 5 | 908 | 919 |
| | | 544 | 561 | | 968 | 1025 |
| | | 557 | 725 | | 833 | 1144 |
| | | | 663 | | | |
| Bird Average | | 62.3 | 64.4 | | 90.3 | 102.9 |
| % Difference | | | 3.5 | | | 14.0 |
| | 9 | 1335 | 1514 | 10 | 1495 | 1797 |
| | | 1251 | 1531 | | 1525 | 1497 |
| | | 1268 | 1623 | | 1401 | 1910 |
| | | | | | 1600 | 1822 |
| | | | | | 1637 | 1772 |
| Bird Average | | 128.5 | 155.6 | | 153.2 | 176.0 |
| % Difference | | | 21.1 | | | 14.9 |
| | 12 | 2052 | 2175 | 13 | 2100 | 2518 |
| | | 2078 | 2145 | | 2250 | 2204 |

TABLE 1-continued

BIRD WEIGHT READINGS IN GRAMS ARE FOR 10 BIRD LOTS
BIRD WEIGHT READINGS ARE FOR 5 BIRD LOTS ON DAY 20

| DAY | CONVENTIONAL FEEDER | NEW FEEDER | DAY | CONVENTIONAL FEEDER | NEW FEEDER |
|---|---|---|---|---|---|
| | 2032 | 2700 | | 2041 | 2443 |
| | | 2060 | | 2128 | 2425 |
| Bird Average | 205.4 | 227.0 | | 213.0 | 239.8 |
| % Difference | | 10.5 | | | 12.6 |
| 16 | 2374 | 2690 | 20 | 1885 | 1998 |
| | 2617 | 2894 | | 1823 | 1946 |
| | 2643 | 2859 | | 1573 | 1950 |
| | 2309 | 2650 | | 1648 | 1933 |
| | | | | 1550 | 1875 |
| Bird Average | 248.6 | 277.3 | | 339 | 388 |
| % Difference | | 11.6 | | | 14.4 |

TABLE 2

| | UNITS ARE POUNDS GROUPS OF 4 | | | UNITS ARE GRAMS GROUPS OF 2 | | |
|---|---|---|---|---|---|---|
| DAY | CONVENTIONAL FEEDER | NEW FEEDER | DAY | CONVENTIONAL FEEDER | NEW FEEDER | |
| 29 | 6.23 | 8.17 | 37 | 2093 | 2374 | |
| | 6.98 | 8.28 | | 2850 | 2366 | |
| | 6.17 | 7.40 | | 2785 | 2515 | |
| | 6.81 | 7.67 | | 1964 | 2260 | |
| | 7.09 | 7.6 | | 2130 | 2815 | |
| | 5.68 | 6.67 | | 2279 | 2590 | |
| | 7.12 | 7.71 | | 2665 | 2540 | |
| | 6.48 | 8.44 | | 2502 | 2162 | |
| | 6.32 | 7.49 | | 1953 | 2830 | |
| | 5.90 | 7.64 | | 2090 | 2720 | |
| | 5.88 | 8.22 | | 2055 | 2607 | |
| | | 7.49 | | 2446 | 2656 | |
| | | 8.17 | | 2529 | 2864 | |
| | | 7.18 | | 2536 | 2580 | |
| | | 6.79 | | 2300 | 2580 | |
| | | 7.20 | | | | |
| | | 8.35 | | | | |
| | 70.66 | 130.4 | | 35177.0 | 38459.0 | |
| Bird Average | 729.0 | 871.0 | GRAMS | 1172.5 | 1281.9 | GRAMS |
| % Difference | | 19.5 | | | 9.3 | |

Table 3 shows the results of a large scale test of the invented feeder with a flock size greater than 10,000 turkeys.

TABLE 3

UNITS ARE GRAMS

| DAY | CONVENTIONAL FEEDER | NEW FEEDER | % Increase | WEIGHT INCREASE |
|---|---|---|---|---|
| 2 | 62.3 | 64.4 | 3.5 | 2.2 |
| 5 | 90.3 | 102.9 | 14.0 | 12.6 |
| 9 | 128.5 | 155.6 | 21.1 | 27.1 |
| 10 | 153.2 | 176.0 | 14.9 | 22.8 |
| 12 | 205.4 | 227.0 | 10.5 | 21.6 |
| 13 | 213.0 | 239.8 | 12.6 | 26.8 |
| 16 | 248.6 | 277.3 | 11.6 | 28.8 |
| 20 | 339.2 | 388.1 | 14.4 | 48.9 |

TABLE 3-continued

UNITS ARE GRAMS

| DAY | CONVENTIONAL FEEDER | NEW FEEDER | % Increase | WEIGHT INCREASE |
|---|---|---|---|---|
| 29 | 729.1 | 871.1 | 19.5 | 142.0 |
| 37 | 1172.6 | 1282.0 | 9.3 | 109.4 |
| 147 | 13598.9 | 14806.6 | 8.9 | 1207.6 |

Day 147 represents harvest day.

Figures 28, 29:
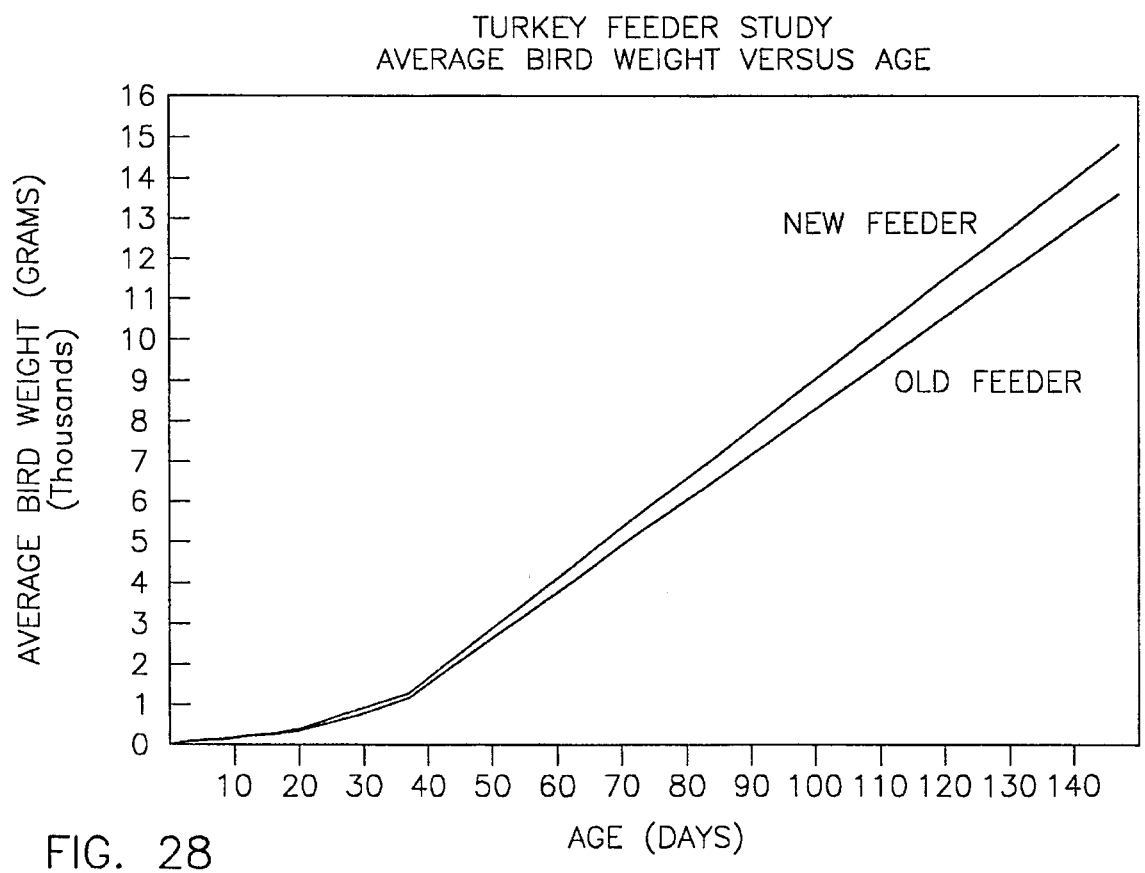
FIG. 28 is a graph of turkey weight increase for birds using the invented feeder and for birds using a conventional feeder.
FIG. 29 is a table of turkey weight increase for birds using the invented feeder and for birds using a conventional feeder.

FIG. 28 is a graphical depiction of the increase in weight for birds using the invented feeder, labeled as NEW FEEDER, as compared to weight gain for a similar group using a conventional feeder, labeled as OLD FEEDER. The invented feeder in this test was used for thirty (30) days. As shown in FIG. 29, the weights of the birds using the invented feeder averaged better than ten (10%) percent over the birds using the conventional feeder. Surprisingly even after the use of the invented feeder was discontinued the birds which had started on the invented feeder still had an average weight in excess of eight (8%) percent over the birds that started life with the conventional feeder.

SUMMARY OF THE ACHIEVEMENT OF THE OBJECTS OF THE INVENTION

From the foregoing, it is readily apparent that we have invented an improved feeding device to be used in turkey brooder houses which will promote better turkey health and more rapid weight gain by increasing access to feed while eliminating feed contamination with fecal matter and bedding material. This invention provides a hopper-trough feeder with a specific geometric configuration which will maximize poult access to the feed for feeding and render it impossible for poults to stand or walk around in the feed trough. As a free standing hopper-trough feeder this apparatus replaces the conventional open pan feeders now used in commercial brooder houses for feeding turkeys during the first few days of life, which will hold sufficient feed to support turkeys until they are ready to transition to an automatic conveyor feeding system without the need for refilling. Beneficially this apparatus replaces the open feed pans used on most commercial automatic conveyor feed systems. Easily disassembled for cleaning this apparatus also provides compact storage when not in use.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A bird feeder comprising:
   a feed storage hopper;
   said hopper having an inverted frustum having a bottom, a peripheral wall and an open top;
   said bottom being flat adjacent to said peripheral wall with a concentric conical projection rising out of said bottom;
   said concentric conical projection having a connecting means;
   said peripheral wall having uniformly spaced feed distribution aperture spaced from said bottom;
   a feed trough having a flat floor, a concentric projection rising out of said floor and outwardly sloping peripheral wall;
   said concentric projection having a connecting means; and
   said feed storage hopper being connected to said feed trough.

2. A bird feeder according to claim 1 wherein said feed storage hopper is a single piece.

3. A bird feeder according to claim 1 wherein said outwardly sloping peripheral wall of said trough further comprises a semicircular stiffener rim.

4. A bird feeder according to claim 1 wherein said feed trough is unitary.

5. A bird feeder according claim 1, wherein said feed storage hopper peripheral wall is outwardly sloping at a specific angle which will preclude a new born poult's center of gravity from passing over said peripheral wall of said feed trough whereby said peripheral wall of said feed storage hopper prevents poults from entering said feed trough to contaminate feed or block access to other poults for feeding.

6. A bird feeder according to claim 1 further comprising bolster fins near said open top of said inverted frustum.

7. A bird feeder according to claim 1 further comprising:
   a plurality of hopper tabs, integral with said inverted frustum located about the periphery of said open top.

8. A bird feeder according to claim 7 wherein each hopper tab has an underside, further comprising:
   a pair of stops located on said underside of said hopper tabs.

9. A bird feeder according to claim 8 further comprising:
   an adaptor ring consisting of a circular ring having an inside with alternating top and bottom tabs on said inside of said ring to form a grappling slot for connection to the distribution header of any commercial automatic feed conveying system.

10. A bird feeder according to claim 9 further comprising:
    a plurality of cantilever arms each having tab projecting from said adaptor ring;
    whereby said feeder is connected to said adaptor ring by insertion of the cantilever arm tabs between the tabs at the top of the feed hopper and rotating approximately 45 degrees to engage the underside of said hopper tabs.

11. A bird feeder comprising:
    a) a feed storage hopper comprising;
       said hopper having an inverted frustum having a bottom, a peripheral wall and an open top;
       said bottom being flat adjacent to said peripheral wall with a concentric conical projection having an apex and rising out of said bottom;
       said concentric conical projection having a threaded connector at said apex;
       said peripheral wall having uniformly spaced feed distribution apertures spaced about said bottom;
    b) a feed trough having a flat floor, a concentric conical projection having an apex and rising out of said floor, and an outwardly sloping peripheral wall; having an outer rim;
       said concentric conical projection having a threaded sleeve at said apex; and
       said feed storage hopper being connected to said feed trough.

12. A bird feeder according to claim 11, wherein said outwardly sloping peripheral wall of said trough further comprises a semicircular stiffener rim.

13. A bird feeder according claim 11, wherein said feed storage hopper peripheral wall is outwardly sloping at a specific angle which will preclude a new born poult's center of gravity from passing over said outer rim of said feed trough whereby said peripheral wall prevents poults from entering said feed trough to contaminate feed or block access to other poults for feeding.

14. A bird feeder according to claim 11 further comprising bolster fins near said open top of said inverted frustum.

15. A bird feeder according to claim 11 further comprising:
    a plurality of hopper tabs, having an underside, integral with said inverted frustum located about the periphery of said open top.

16. A bird feeder according to claim 15 further comprising a pair of stops located on said underside of said hopper tabs.

17. A bird feeder according to claim 16 further comprising:

an adaptor ring consists of a circular ring having an inside with alternating top and bottom tabs on said inside of said ring to form a grappling slot for connection to the distribution header of any commercial automatic feed conveying system.

18. A bird feeder according to claim 17 further comprising:

a plurality of cantilever arms each having a tab projecting from said adaptor ring;

whereby said feeder is connected to said adaptor ring by insertion of the cantilever arm tabs between the tabs at the top of the feed hopper and rotating approximately 45 degrees to engage the underside of said hopper tab.

19. A poultry feeder comprising:

a unitary feed storage hopper;

said hopper having an inverted frustum having a bottom, a peripheral wall and an open top;

said bottom being flat adjacent to said peripheral wall with a concentric conical projection having an apex and rising out of said floor;

said concentric conical projection having a threaded stud at said apex;

said peripheral wall having oblong uniformly spaced feed distribution apertures spaced from said bottom;

a unitary feed trough having a flat floor, a concentric conical projection having an apex, and rising out of said floor and outwardly sloping peripheral wall having a semicircular stiffener rim;

said concentric frustum projection having a threaded at said apex;

said feed storage hopper being threadedly connected to said feed through; and whereby said feed trough dish is attached to said feed storage hopper by means of a threaded stud and threaded sleeve insert allowing for quick disconnection of said feed storage hopper and feed trough dish by twisting, said poultry feeder facilitating uniform feed distribution to an unobstructed circular feed trough formed by the junction of said feed storage hopper with said feed trough.

20. A poultry feeder according to claim 19 further comprising bolster fins near said open top of said inverted frustum.

* * * * *